INVENTORS
HENRY G. HOWARD, JR.
LEE H. KNIGHT, JR.
BY ROBERT L. MORRIS

ATTORNEY

Dec. 29, 1970   H. G. HOWARD, JR., ET AL   3,550,188
APPARATUS FOR CONTINUOUSLY INSERTING INDIVIDUAL RIGID
MEMBERS INTO RESPECTIVE INDIVIDUAL SOFT BODIES
Filed Dec. 27, 1967   6 Sheets-Sheet 5

INVENTORS
HENRY G. HOWARD, JR.
LEE H. KNIGHT, JR.
BY ROBERT L. MORRIS

ATTORNEY

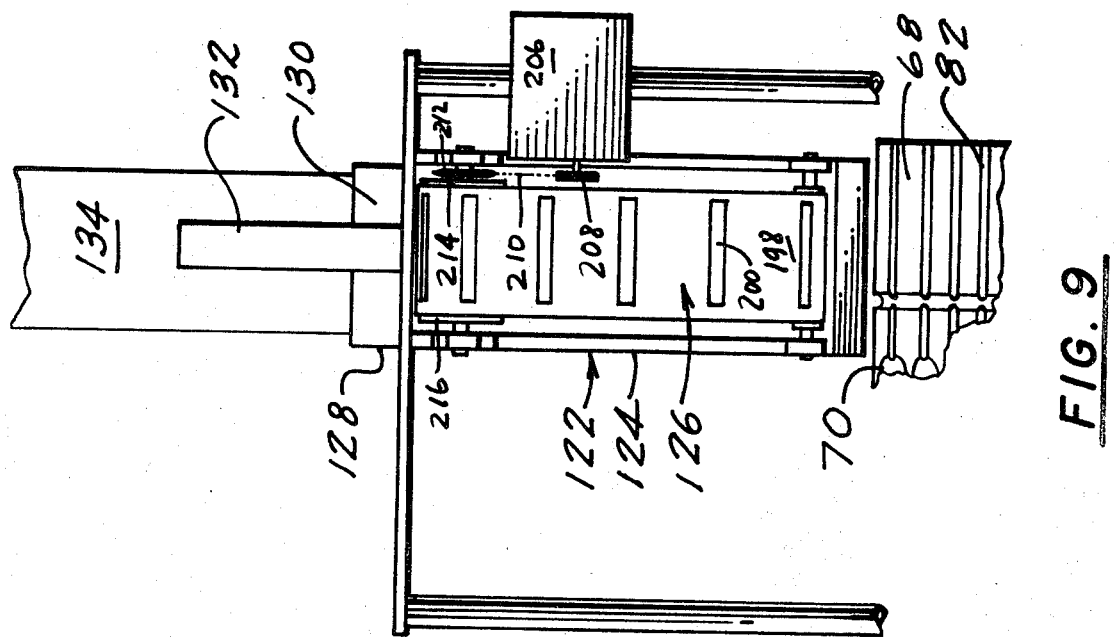
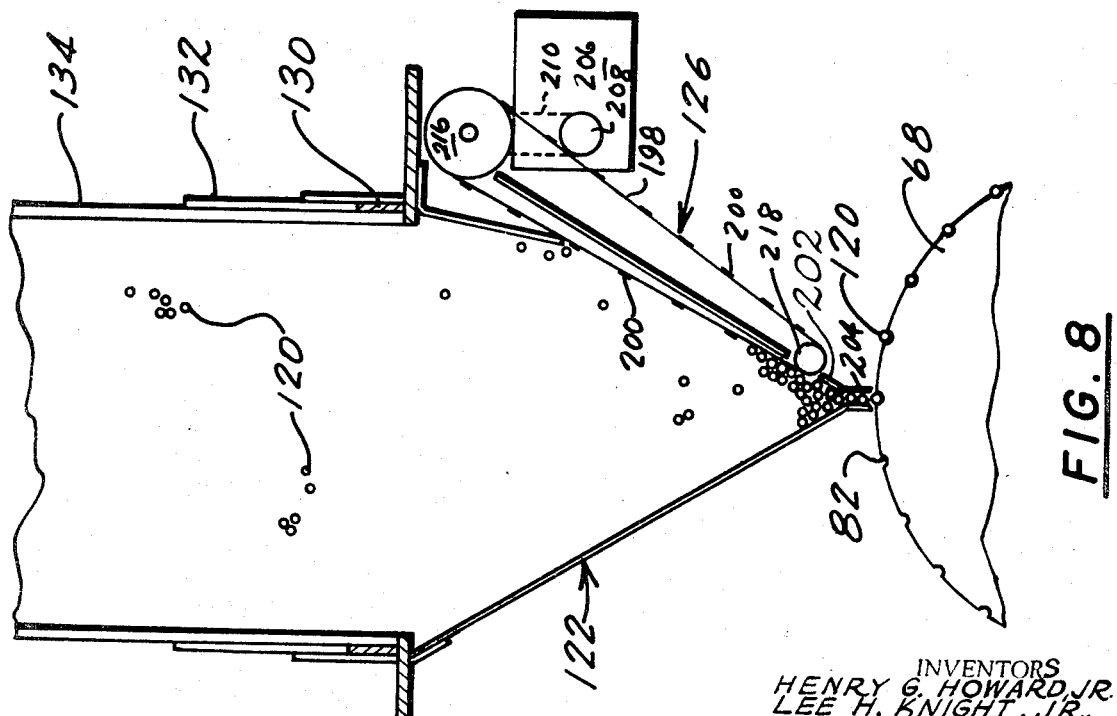
INVENTORS
HENRY G. HOWARD JR.
LEE H. KNIGHT JR.
BY ROBERT L. MORRIS
ATTORNEY

| United States Patent Office | 3,550,188
Patented Dec. 29, 1970 |

3,550,188
APPARATUS FOR CONTINUOUSLY INSERTING INDIVIDUAL RIGID MEMBERS INTO RESPECTIVE INDIVIDUAL SOFT BODIES
Henry G. Howard, Jr., De Kalb County, Lee H. Knight, Jr., Doraville, and Robert L. Morris, Decatur, Ga., assignors to Suzanna's Kitchen, Inc., Doraville, Ga., a corporation of Georgia
Filed Dec. 27, 1967, Ser. No. 693,827
Int. Cl. A22c 17/00
U.S. Cl. 17—1        18 Claims

ABSTRACT OF THE DISCLOSURE

A machine which automatically inserts a stick into a respective weiner to make a weiner-on-a-stick which is sometimes battered with a corn batter and fried into a product known as a "corndog." The machine comprises a conveyor continuously transporting weiners and properly feeding each weiner into a respective depression on a drum which also has a stick depression aligned therewith. There are numerous respective weiner depressions and stick depressions spaced around the periphery of the drum and said depressions constantly are being refilled with a respective weiner and a stick. After the respective weiner and respective stick are fed into the respective depressions in the drum, a camming member forces the stick longitudinally into the weiner and thereafter the assembled stick and weiner are ejected from the drum by means of a small blast of air and ejector.

According to the present method, the weiners are placed in approximately parallel position, then driving pressure is generated on the weiners to assist in proper orientation and maintenance of alignment until a stick is inserted, the weiner is temporarily held in a slot, and a stick is inserted into the weiner by a driving force pushing the stick substantially longitudinally and axially of the weiner to insert the stick therein after which the weiner and assembled stick are collected.

BACKGROUND OF THE INVENTION

(1) Field of the invention

Machines for automatically and continuously inserting a substantially rigid member such as a handle or a stick into a soft body such as a weiner. Also, methods for continuously inserting a sharp, rigid member into a soft body and especially in the art of food processing wherein weiners or frankfurters are continuously fed down a line and some rigid member such as a stick is inserted respectively and continuously in the respective members in a continuous operation.

(2) Description of the prior art

A weiner on a stick is a well known food item. A batter may be applied to the outside of the weiner and then the whole thing fried which causes the batter to cook and the result is sometimes known as a "corndog." Usually a sharp pointed wooden stick is inserted by hand into the weiner or hotdog which is a slow operation if any quantity per hour is desired. There are various problems involved in trying to assemble the pointed sticks into the weiner by machine. Weiners or hotdogs are not of a constant shape or size even though the weight may be approximately the same since some of the hotdogs or weiners bend more than the others and some tend to be thicker at one end than the other and so forth. This makes it difficult to standardize the feeding of such irregularly shaped items. Also, there is a certain amount of grease or tallow produced by a weiner or hotdog which becomes a problem in handling especially if any heat or friction is employed which causes this tallow to become more or less fluid. The present machine is so arranged as to deal with any problems of grease or tallow and also to deal with and properly handle and orient hotdogs or weiners of the normal variations in size and shape.

DESCRIPTION OF THE INVENTION

In a preferred embodiment the machine comprises a belt-type conveyor with chicken ladder type traction lugs on it and onto which weiners or hotdogs are placed by hand in a substantially parallel side-by-side position. The conveyor passes through a sanitary tunnel which may be constructed from plastic of such a size as to fit closely about the hotdogs as they pass therethrough and to build up a small amount of driving pressure resulting from a small amount of force on each hotdog. The hotdogs are delivered with this small amount of pressure from the conveyor through a curved chute which feeds the dogs directly onto the periphery of a rotating drum having peripheral grooves, slots or depressions therein corresponding with the length of a hotdog and of a depth to hold the hotdog therein during the time the stick is being inserted. The drum also includes slots, grooves, or depressions in permanent alignment with each one of the respective hotdog grooves or depressions and pointed sticks or other similar rigid members are being fed from a hopper type conveyor into the respective depressions in the drum. The sticks are fed in such a way as to position the stick in the depression in the drum with the pointed end aligned with the end of the hotdog in which it is inserted. A curved plate or chute carries an arcuate camming member which is interposed in the way of the end of the sticks as they are moved from the positioning on the drum and the force imparted on the end of the stick by the drum continuing to move and pushing the end of the stick against the camming surface which runs in a curve approximately from one side of the drum just after the sticks have been placed therein to the other side of the drum after the sticks have been driven into the hotdogs. Openings on the inside of the depressions for the hotdogs are provided with an air blast to assist in removing the hotdogs from the depressions. Infrared heat or other heat may be used to reduce sticking. The camming chute arrangement is pivoted or hinged on the machine so that it may be moved out of the way for cleaning or the like but normally it is in a fixed position with respect to the surface and periphery of the drum. Therefore, the operation of the machine is such that there is a continuous depositing of hotdogs and sticks in slots in the drum and the drum continuously rotates to bring the sticks against the camming surface thereby continuously inserting each stick in the respective hotdog after which it is removed from the drum and the drum continues around picking up another hotdog and so forth in a constant, continuous and repetitive cycle.

BRIEF DESCRIPTION OF THE DRAWINGS

FIG. 8 is a vertical cross-sectional view through the hopper.

FIG. 9 is a front elevation view of the hopper shown in FIG. 8.

DESCRIPTION OF THE PREFERRED EMBODIMENT

In the preceding description as well as the ensuing description, the expression "corndog" refers generally to a hotdog, weiner or frankfurter, or similar food item, having a rigid handle such as a pointed wooden or plastic stick inserted therein. As mentioned previously, such a food item may be covered with a batter and fried or may be garnished in some other fashion. In the present specification the expression normally refers to the assembled hotdog with a stick inserted in it.

Figure 1:
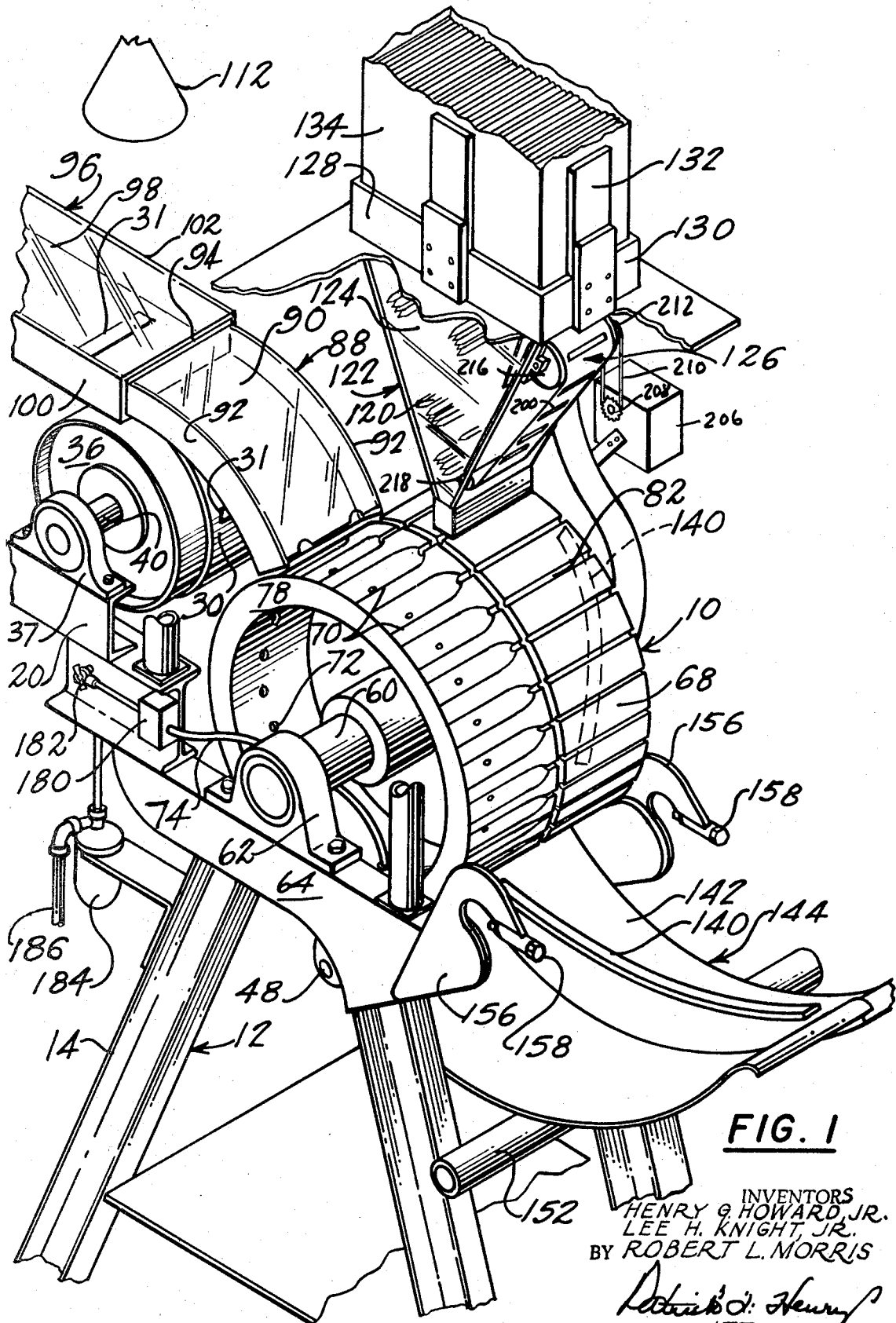
FIG. 1 is a perspective view of a machine made in accordance with the present invention and in a condition of operation continuously putting sticks into hotdogs.
Figure 2:
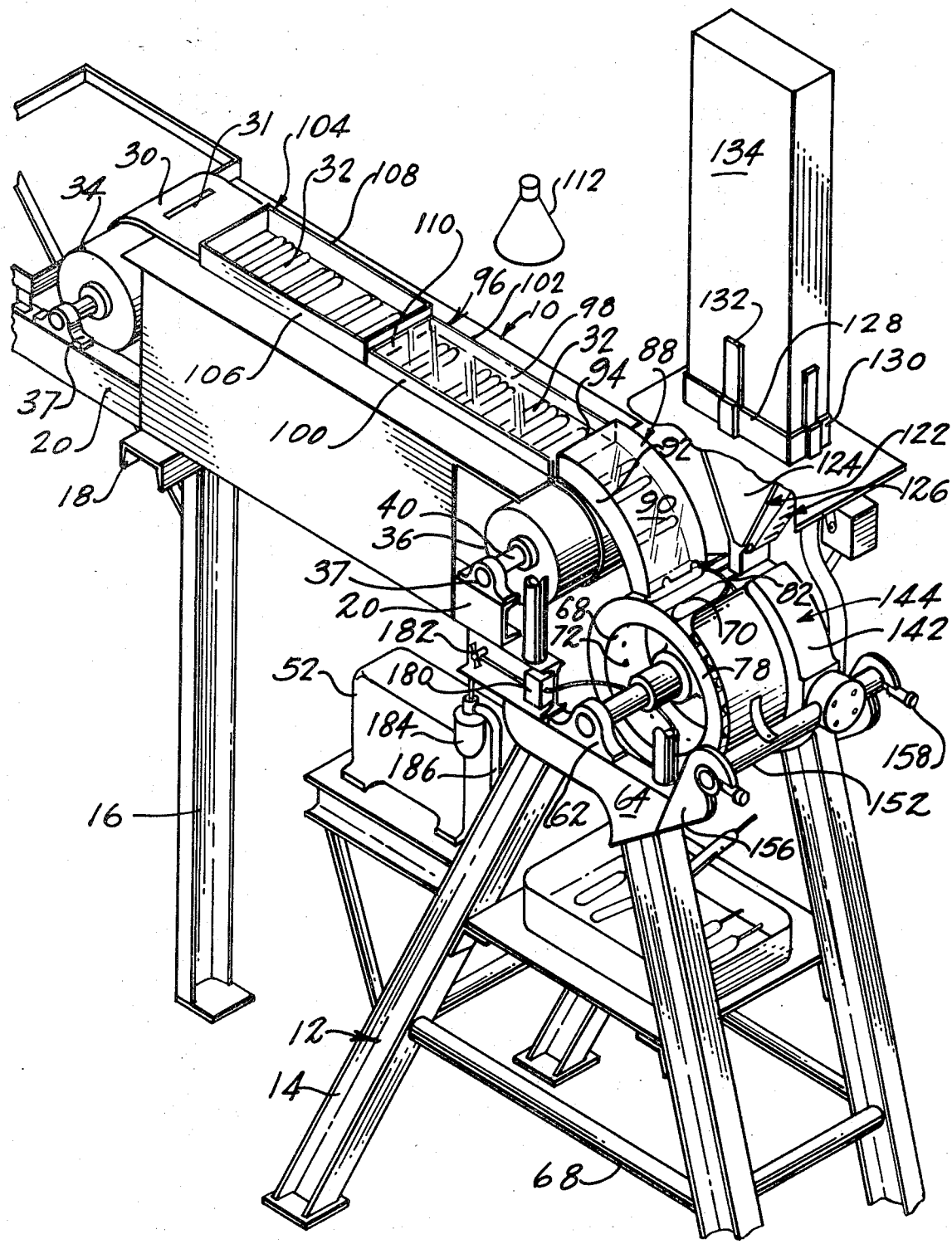
FIG. 2 is a perspective view of one end of the machine shown in FIG. 1 in enlargement and with a portion of the machine moved out of normal position to expose the drum.

Referring initially to FIGS. 1 and 2 and thence as the specification unfolds to the other figures of the drawings and back and forth among the various figures as reference changes from one part to another, in FIGS. 1 and 2 the machine is designated generally and overall by the reference numeral 10 and it comprises a stabilized machine frame designated generally by reference numeral 12 having a base constructed from angle iron members, there being diagonal angle iron members 14 constructed and assembled somewhat in the fashion of a sawhorse and on which is supported the final end of the machine and being spaced from the diagonal members 14 is a vertical support 16 having a frame member 18 welded or otherwise secured thereto horizontally thereacross and supporting the input or entry end of the machine 10. Longitudinal frame members 20, 22 form a conveyor bed and passageway substantially longitudinally across the frame member 18 to the tops of the diagonal, sawhorse members 14.

A tray 24 of substantially rectangular construction and made from stainless steel or the like is mounted on the input end of the machine and is held in place by small brackets 26 thereon.

Figure 3:
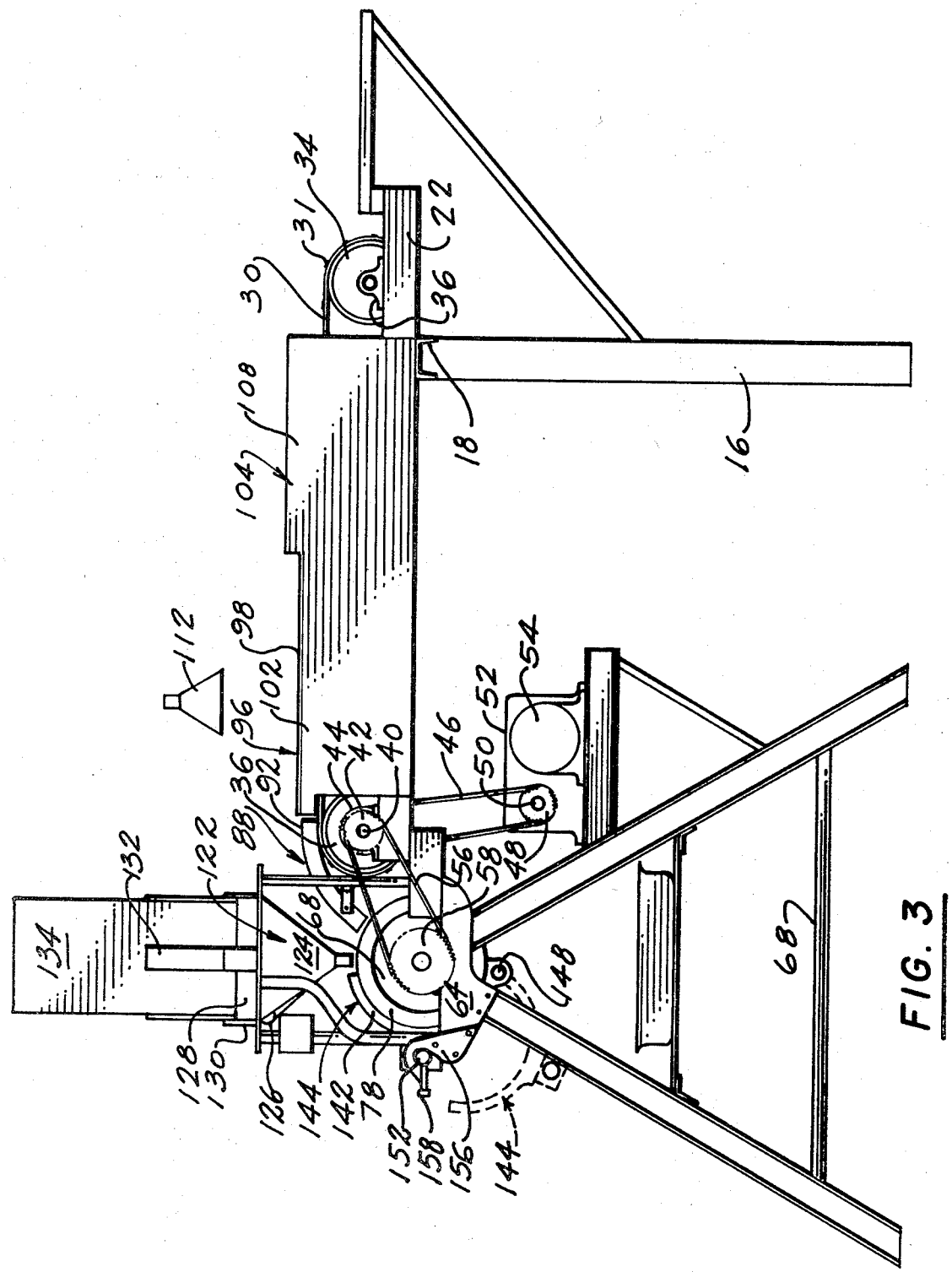
FIG. 3 is a side elevation view of the machine shown in FIG. 1.

A continuous conveyor belt 30 which may be a flat belt constructed of mesh, woven material or the like, preferably has a plurality of chicken ladder type traction lugs on it which stick-up from the surface and prevent the hotdogs 32 from rolling an unlimited amount. Conveyor belt 30 operates continuously about a pair of spaced opposed conveyor drums 34, 36 each of which is mounted in a journal bearing assembly 37 on respective longitudinal frame members 20, 22. As seen in FIG. 3, the conveyor belt 30 is driven by the drum 36 which is rotated on shaft 40 having sprocket 42 and another sprocket 44 which is driven from a chain 46 driven by the output sprocket 48 from an output shaft 50 on a transmission unit 52 powered from a motor 54. Sprocket 42 on shaft 40 drives a chain 56 which drives a sprocket member 58 mounted on a shaft 60 carried by opposed journal bearing members 62 on a frame 64 constructed on top of the sawhorse arrangement provided by the diagonal members 14 which are connected together near the bottom by frame member 68. Shaft 60 has mounted thereon for fixed rotation therewith a large drum 68 which is preferably constructed from metal and which may be covered with stainless steel or otherwise fashioned in a sanitary manner by sutable plating or the like.

Figure 6:
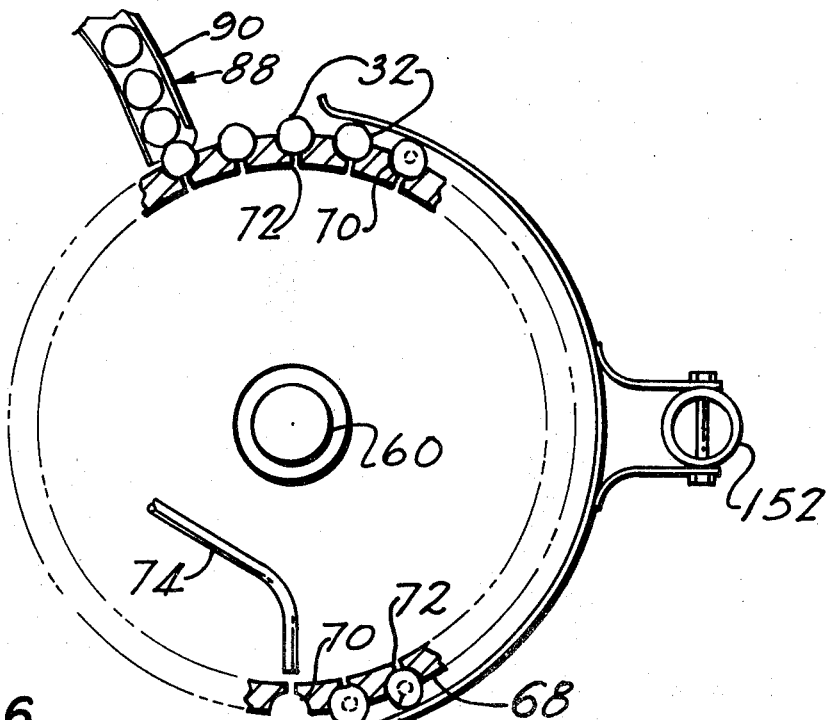
FIG. 6 is a section view of the drum looking toward the stick end of the hotdogs.

As seen in FIGS. 2 and 6 as well as other figures, drum 68 is provided on one side with a plurality of spaced, peripheral grooves, slots or depressions 70 which are hotdog or weiner receiving and positioning locations and as seen in FIG. 6 the hotdogs or weiners 32 are dropped continuously into a respective slot or depression 70 each one of which has a small opening 72 on the inside thereof to receive a blast of air from a small tube 74. Each slot or depression 70 is approximately the length of the usual weiner or hotdog and there is an outer flange or rim 78 against which one end of the hotdogs may be pushed if relative motion takes place in this direction.

The other side of drum 68 is provided with a series or arrangement of spaced stick or handle depressions, slots, grooves or channels 82 each one of which corresponds with a respective hotdog depression or groove 70 and each stick groove or depression 82 is permanently and fixedly located in alignment with each of one of the hotdog or weiner depressions or channels 70.

HOTDOG DELIVERY

Figure 7:
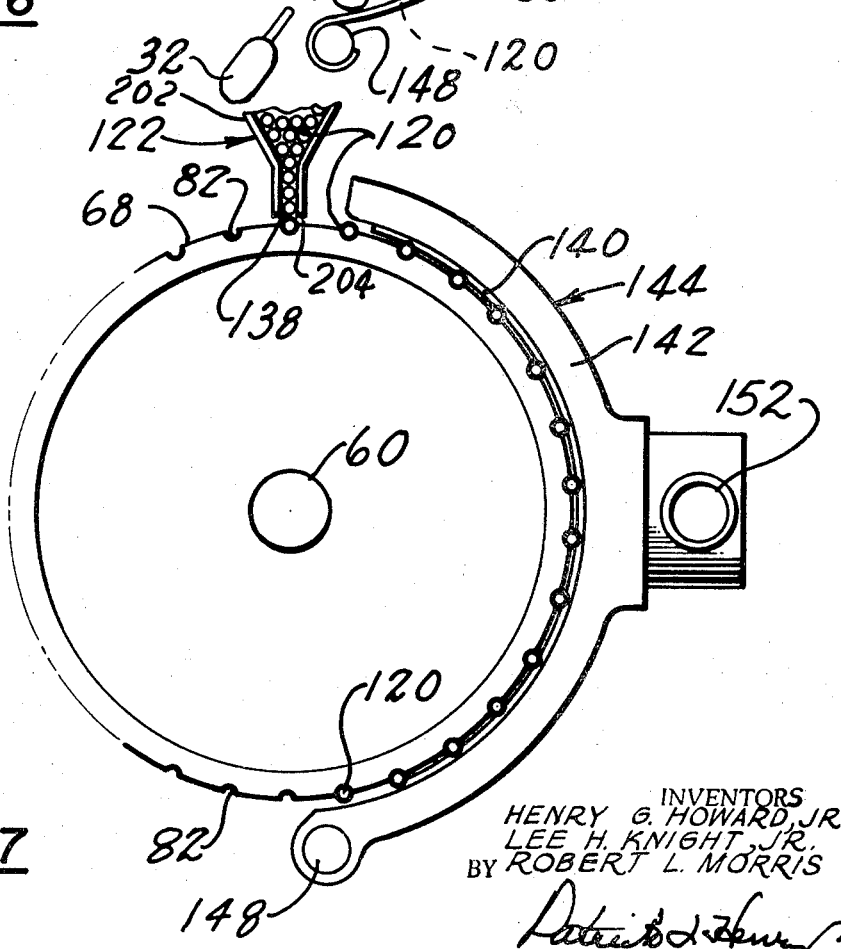
FIG. 7 is a section view of the drum looking from the side opposite from that of FIG. 6 toward the unpointed ends of the sticks.

The hotdogs, weiners or frankfurters 32 are continuously delivered and deposited in a respective slot, depression or groove 70 leaving the curved chute 88 which may be constructed from transparent plastic or other material having a curved cover portion 90 and sides 92 mounted around the end of the conveyor belt 30 where it passes around the drum 36. End 94 of chute 88 is open and provides an entrance for the hotdogs 32 which are forced under a small pressure through a covered tunnel designated generally by reference numeral 96 and comprising a transparent cover 98 of plastic or the like mounted across the top of the conveyor belt 30 and between side members 100, 102 which are spaced according to the size of the hotdog being handled. The hotdogs are placed by hand in side-by-side, substantially parallel relationship as shown in FIG. 1 in a tray 104 having sides 106, 108 and an open end 110 leading into the covered tunnel 96. The chicken ladder traction type lugs 31 serve to help drive the hotdogs 32 and keep them properly aligned. With the force of gravity and friction on the belt the hotdogs 32 are drawn into the transparent covered tunnel 96 on the way to the chute 88 and the drum 68 and since the hotdogs 32 are deformable and soft and are curved, bent and distorted in various shapes, the tunnel helps straighten the hotdogs out and to place them in line under slight pressure generated by the friction of the belt moving under the hotdogs as they are pressed onto the conveyor belt by the transparent top cover 98 of the tunnel. The sum of all the small force on each hotdog 32 in the tunnel is the amount of driving force, and friction of the hotdogs 32 against the top of the cover 98 may be reduced by warming that side of the dogs with infrared heat from infrared heat lamps 112 mounted and adjusted as desired. The tallow on the hotdog may be warmed from a sticky substance to a more fluid lubricant between the hotdogs 32 and the cover 98. Thus, the hotdogs are sort of straightened out into a more consistent shape and pushed closer together in the tunnel 96 prior to being released to the chute 88 as they are propelled by the movement of the conveyor belt 30 and the force of the line of hotdogs 32 through the chute 88 and into a respective depression 70 in the drum 68. The orientation of the hotdogs 32 and the forming of the hotdogs 32 into a more consistent shape remains long enough for the hotdogs to receive a stick 120 which is supplied from a tapered hopper 122 that may have transparent sides 124 on which is mounted an agitator 126. The top of the hopper is provided with sides 128 and ends 130 forming a ledge having supports 132 thereon in which is positioned a conventional and ordinary box 134 of sticks 120. Sticks 120 are allowed to fall by gravity aided by the vibration from the vibrator 126 through the small outlet 138 in which the sticks as seen in FIG. 7 must assume single row vertical position one-at-a-time and being deposited one-at-a-time in a respective slot 82 in the drum 68. It should be noted that the sticks protrude out of the slot 82 and do not drop down into the slot since this is important from the standpoint of engaging the camming member 140 which will now be described.

THE CAMMING DEVICE

A camming member 140 is constructed from a strip metal or the like and extends in a gentle curve along a camming shoe 142 forming part of the general camming arrangement 144. Camming arrangement 144 is hinged on a pin 148 mounted on the frame 64 and normally overlays a portion of the outer periphery of the drum 68 leaving approximately from the first stick 120 after delivery from the exit 138 approximately in the position of a dotted line shown in FIG. 2. The camming member 140 is moved into this position by swinging the entire camming assembly 144 into the position shown in FIG. 1 and causing a camming lock bar 152 to move into opposed slots on brackets 156 having respective pressure screws 158 therein to latch the camming shoe assembly 144 securely in place in position over a portion of the drum 68 as shown in FIG. 1 which places the camming member 140 almost touching the surface of the stick portion of the drum by virtue of which each stick when dropped into position in a respective slot or groove 82 is brought into engagement with the camming member 140 and is pushed as the drum continues to rotate in the direction of the arrows in FIG. 2 which is into the respective hotdogs 32 resting in their respective depressions or positions 70 in the drum 68. Of course, each stick 120 may be provided with a pointed end to facilitate the insertion into the hotdog 32.

Figure 4:
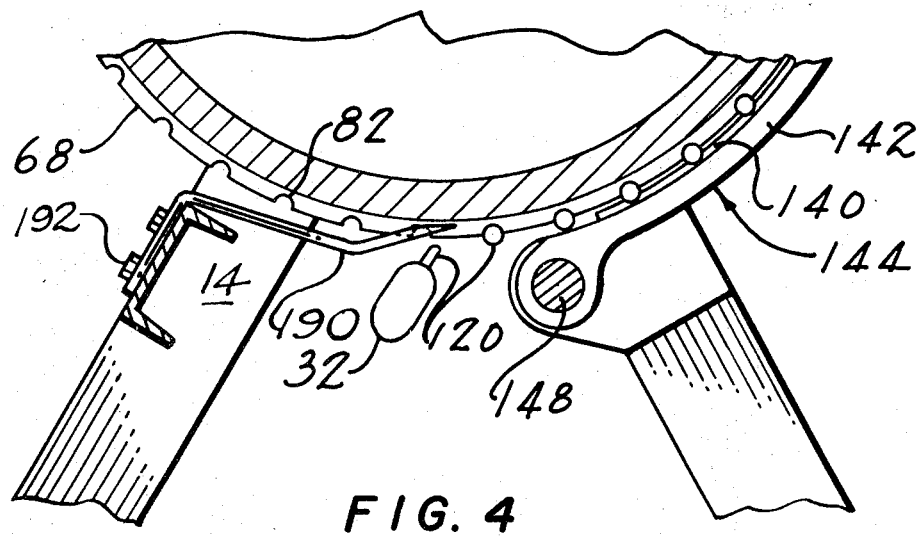
FIG. 4 is a partial section view of the bottom of the drum looking toward the end of the sticks and showing an assembled corndog being removed.
Figure 5:
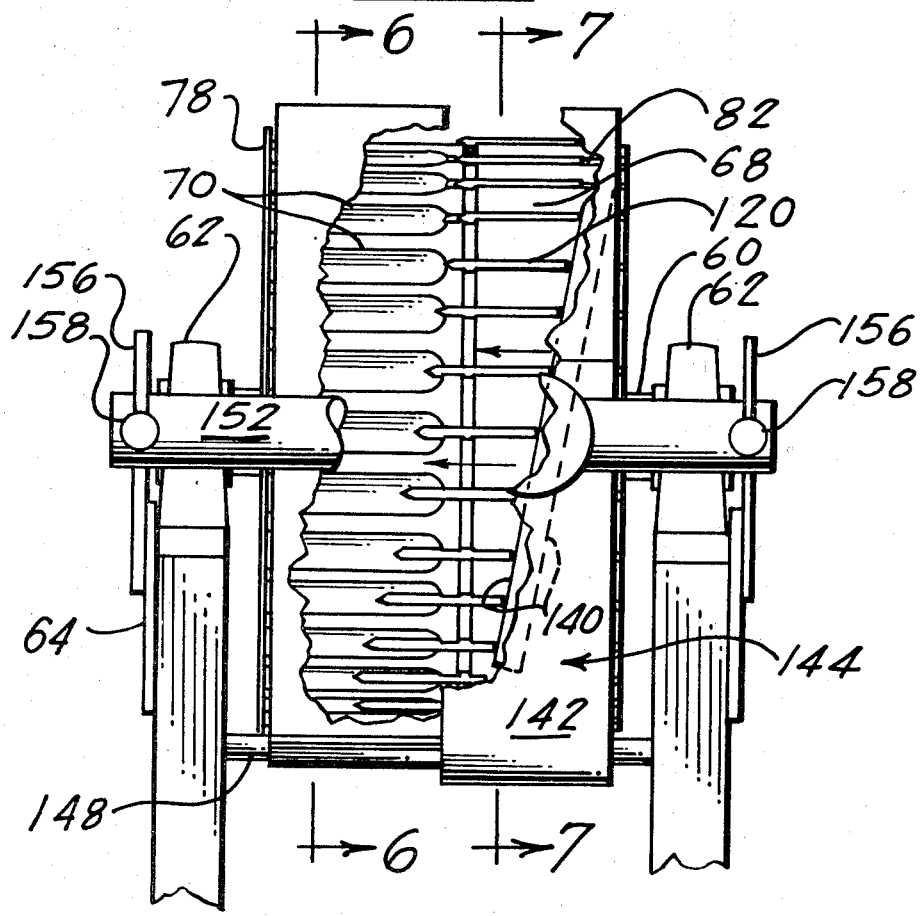
FIG. 5 is a front elevation view of the drum with hotdogs and sticks positioned thereon and illustrating the operation of the camming surface for the sticks with part of the camming shoe broken away.

In FIG. 5 it is readily seen that as the drum 68 rotates with the top coming out of the paper, keeping in mind that each hotdog 32 is being substantially held in place in its respective depression 70, each stick has the outer end thereof engaging the camming member 140 as the drum 68 continues to turn which causes the sticks to move in the direction of the arrows in FIG. 5 which are to be inserted into the end of the hotdogs 32 in the aligned depression 70 with the respective stick depression 82 until the stick has been inserted the proper amount according to the length and extent of the curvature of the camming member 140. After each stick 120 has been inserted in the respective hotdog 32, in the manner shown in FIG. 6, the drum 68 continues to turn until the depression 70 is at the bottom and gravity tends to dislodge the assembled "corndog" assisted by a small blast of compressed air coming through the tube 74 and delivered from a clean air system comprising an air control 180 leading from an air valve 182 from an air filter 184 fed by an air hose 186 from any compressed air source. Also to assist in dislodging the weiner (body) 32 there is a cam finger 190 in the path of the members 120 (see FIG. 4) and this prevents the member 120 from going past the place of dislodgement. Finger 190 is mounted on a bracket 192 on members 14.

Sticks 120 are placed in alignment for proper dispensing from hopper 122 by means of the agitator 126, mentioned previously, which comprises an endless, canvas belt 198 having small, spaced slots or protrusions 200 that contact the sticks 120 (see FIG. 8) and agitate and drive them toward the tapered bottom 202 in hopper 122 which bottom 202 gradually becomes an outlet spout 204 only large enough for one stick 120. Belt 198 is driven by a small electric motor transmission power unit 206 which has an output sprocket 208 driving a chain 210 which drives a sprocket 212 attached to a shaft 214 on a drum or roller 216 about which belt 198 is driven around another roller 218.

While reference has been made in various places herein to hotdogs, weiners and other items constituting the member which is referred to by reference number 32 and to sticks which are the items referred to by reference numeral 120, it should be understood that this is an illustration of a preferred form and use of the present invention which could be used to insert any type of sufficiently rigid member 120 into any body presently in the form of a hotdog 32. Therefore, no effort has been made to name every item which could be provided with a handle or stick continuously by the use of the present machine and method. This is because various alterations, changes, deviations, additions, combinings, modifications and other departures may be made in the machine and method and the particular items acted on by the machine and method without departing from the scope of my invention as defined in the appended claims.

What is claimed is:

1. In a machine for continuously receiving elongated bodies, and continuously inserting a respective elongated handle member into each respective body the combination of:
    (a) a continuously moving conveyor means having a plurality of spaced respective body receiving recesses into which each respective one of the said bodies is temporarily positioned to receive the handle member therein and a respective handle member receiving and positioning channel aligned with and forming a continuation thereof.
    (b) A plurality of individual handle members contained adjacent said conveyor means and delivered individually to a respective handle member channel and insertion means engaging said handle members as said handle member and said bodies are moving, said insertion means inserting each of said handle members into a respective body, said conveyor moving said plurality of handle members and elongated bodies simultaneously, and said insertion means comprising a handle member engaging surface extending at an angle in a direction across the length of said handle members and interposed thereagainst.
    (c) A delivery chute having a confirmed portion therein through which said elongated bodies are delivered in confined movement therein to cause said bodies to retain substantial elongation and to prevent undue bending and distortion thereof, said delivery chute confining said bodies for direct delivery into said respective body receiving recesses and in position and condtioning of elongation to receive the handle.
    (d) And a cover over at least a portion of said conveyor and said handle member engaging surface to assist in maintaining said bodies in place during handle insertion.

2. The device claimed in claim 1, wherein: said insertion means comprises a stationary nonlinear means against which said handle members are directed and there is relative motion between said handle members and said nonlinear means transversely to the direction or motion of said members while in alignment with each body thereby moving each of said handle members in a direction across the path of movement inserting said handle members into a respective body.

3. The device claimed in claim 2, wherein said conveyor means includes a confined tunnel in which said bodies are confined during movement to apply a small amount of pressure and to form same into better alignment to be fed into position.

4. The machine claimed in claim 1, wherein: said conveyors means for moving said handle members in alignment therewith include a continuously rotating drum having the respective body receiving recesses and handle member receiving and positioning channel therein.

5. The device claimed in claim 4, wherein said member receiving recesses and body receiving positioning channel are depressions in the periphery of said drum in spaced locations therearound and each body depression is aligned with a respective member depression.

6. The device in claim 4, wherein: said conveyor means in "a" includes an endless conveyor transporting said weiners to one end thereof, and a confined tunnel through which said weiners are fed to assist in aligning same to be fed thereafter individually into said drum.

7. The device in claim 6 wherein said insertion means in "c" is a camming surface comprising a nonlinear cam engaging the ends of the members being inserted.

8. The device in claim 7 wherein said non-linear cam is an arcuate member protruding into the path of one end of each of the members being inserted and said cam extending in a direction across the drum.

9. The machine in claim 8, wherein said cam is a support over a portion of the drum, said support being selectively movable to provide access to service the drum or other parts.

10. The device in claim 4 wherein said drum is mounted for rotation and said cover is a curved plate which is movably mounted over said drum, there being fastening means for releaseably securing said cover in place.

11. The device claimed in claim 10 wherein said insertion means engaging surface is a non-linear cam member attached to the underside of said cover.

12. The device in claim 11 wherein said cover is hinged about a hinge connected to said machine at one end of said cover.

13. The device in claim 1 wherein said handle members are sticks and there is a stick hopper mounted over said conveyor means to deliver said sticks one at a time to said conveyor.

14. The device in claim 13: A support means for a package of sticks over said stick hopper.

15. The device in claim 1: said delivery chute including a curved tunnel portion with an open end, thereof, close to the conveyor to deliver respective bodies thereto.

16. The device in claim 1, wherein there is second continuous conveyor on said machine delivering said bodies to the conveyor means on which the individual bodies are positoned.

17. The machine in claim 1, wherein each body recess has air means thereat to receive air under pressure assisting in the ejection of the body.

18. The machine in claim 1, wherein there is a means engaging each member to dislodge same from the continuously moving conveyor means after the member is inserted in a body.

References Cited

UNITED STATES PATENTS

| | | | |
|---|---|---|---|
| 2,210,765 | 8/1940 | Mahlke | 17—1 |
| 2,303,566 | 12/1942 | Majestic | 17—1 |
| 2,609,564 | 9/1952 | Grimm | 17—1 |
| 2,815,530 | 12/1957 | Alexander | 17—1 |
| 2,431,489 | 11/1947 | Latini | 107—8(11) |
| 1,692,559 | 11/1928 | Miller | 107—8.1 |
| 1,717,507 | 6/1929 | Hanns | 107—8.1 |
| 1,879,234 | 9/1932 | Hermann | 107—8.1 |
| 1,956,180 | 4/1934 | Shibelli | 107—8.1 |

FRED C. MATTERN, JR., Primary Examiner

R. I. SMITH, Assistant Examiner

U.S. Cl. X.R.

107—8; 118—502